United States Patent
Oba

(10) Patent No.: US 10,166,997 B2
(45) Date of Patent: Jan. 1, 2019

(54) VEHICLE CONTROL DEVICE, VEHICLE CONTROL METHOD, AND PROGRAM

(71) Applicant: SONY CORPORATION, Tokyo (JP)

(72) Inventor: Eiji Oba, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/520,495

(22) PCT Filed: Dec. 1, 2015

(86) PCT No.: PCT/JP2015/005971
§ 371 (c)(1),
(2) Date: Apr. 20, 2017

(87) PCT Pub. No.: WO2016/092775
PCT Pub. Date: Jun. 16, 2016

(65) Prior Publication Data
US 2017/0305440 A1    Oct. 26, 2017

(30) Foreign Application Priority Data
Dec. 12, 2014  (JP) .................................. 2014-251492

(51) Int. Cl.
*G08B 23/00* (2006.01)
*B60W 50/14* (2012.01)
*B60W 50/08* (2012.01)

(52) U.S. Cl.
CPC ............ *B60W 50/14* (2013.01); *B60W 50/08* (2013.01); *B60W 50/082* (2013.01);
(Continued)

(58) Field of Classification Search
CPC ....... B60W 2050/143; B60W 2300/10; B60W 2540/26; B60W 50/08; B60W 50/082; B60W 50/14
See application file for complete search history.

(56) References Cited

U.S. PATENT DOCUMENTS
2013/0018549 A1    1/2013  Kobana et al.

FOREIGN PATENT DOCUMENTS
DE    10 2012 001 312 A1    8/2012
DE    10 2012 023 245 A1    6/2014
(Continued)

OTHER PUBLICATIONS
International Search Report dated Feb. 15, 2016 in PCT/JP2015/005971 filed Dec. 1, 2015.
(Continued)

*Primary Examiner* — Omeed Alizada
(74) *Attorney, Agent, or Firm* — Xsensus LLP

(57) ABSTRACT

A method for decelerating a vehicle, a non-transitory computer-readable medium for performing the method, and reception apparatuses. The method includes monitoring a state of a driver of the vehicle, and causing a notification to be output based on the monitored state of the driver. The method further includes determining, by circuitry of an information processing apparatus and when operating in a manual operation mode, whether to cause the vehicle to decelerate after the notification is output. The vehicle is caused by the circuitry to decelerate based on the determination of whether to cause the vehicle to decelerate. A passenger of the vehicle may trigger an automatic emergency stop (unit 23), which in turn may be overridden by the driver (switch 24).

22 Claims, 8 Drawing Sheets

(52) U.S. Cl.
    CPC ... *B60W 2050/143* (2013.01); *B60W 2300/10* (2013.01); *B60W 2540/26* (2013.01)

(56) References Cited

FOREIGN PATENT DOCUMENTS

| | | |
|---|---|---|
| DE | 10 2013 009 339 A1 | 12/2014 |
| JP | 8-268287 A | 10/1996 |
| JP | 2007-188 A | 1/2007 |
| JP | 2010-57664 A | 3/2010 |
| JP | 2014-19301 A | 2/2014 |
| JP | 2014-167438 A | 9/2014 |
| WO | WO 2013/008299 A1 | 1/2013 |

OTHER PUBLICATIONS

Office Action dated Nov. 2, 2017 in Japanese Patent Application No. 2014-251492 (with English language translation).

VEHICLE CONTROL DEVICE, VEHICLE CONTROL METHOD, AND PROGRAM

TECHNICAL FIELD

The present disclosure relates to a vehicle control device, a vehicle control method, and a program, and more particularly to a vehicle control device, a vehicle control method, and a program offering safer assistance for an emergency stop of a running vehicle.

CROSS REFERENCE TO RELATED APPLICATIONS

This application claims the benefit of Japanese Priority Patent Application JP 2014-251492 filed on Dec. 12, 2014, the entire contents of which are incorporated herein by reference.

BACKGROUND ART

Technologies for realizing automatic driving of an automobile have been rapidly developing. An example of technologies associated with automatic driving and progressing in recent years is a lane departure warning system (Lane Departure Warning System) which emits a warning when a running vehicle departs from a lane. This lane departure warning system emits a warning using vibrations or voices, for example, when a running vehicle starts departure from a lane in accordance with lowering of awakening of a driver on a monotonous road. This lane departure warning system is recognized as an effective system for avoiding an accident of a vehicle beforehand, caused as a result of departure from a lane. It is further confirmed that this effect considerably reduces lane departure accidents of vehicle groups carrying the lane departure warning system from statistical viewpoints.

Moreover, technologies for detecting an obstacle by using a millimeter-wave radar utilizing millimeter waves, a LIDAR (Light Detection and Ranging) utilizing lasers instead of millimeter waves, and a stereo camera, have been developed as sensing technologies around a vehicle for measuring a distance between the vehicle and a vehicle running ahead, and the arrangement of the vehicle. Along with this development, applications such as an adaptive cruise control system (Adaptive Cruise Control) for maintaining a distance between a vehicle and a vehicle running ahead at a constant distance, and an emergency collision reduction and prevention brake system have been currently put to practical use.

Further developed have been a technology for emitting a warning to a driver by using a visual or auditory alarm for warning based on determination made in accordance with the degree of awakening and the degree of tension of the driver during driving, and an HMI (Human Machine Interface) technology called a haptics technology, provided on a handle or a seat to give tactile vibrations or the like (see PTL 1).

These technologies have been forming a technical base, along with introduction of a large-scale sensing system, for realization of an automatic stop of a vehicle as an emergency stop at the time of the necessity of an emergency stop of a vehicle as a result of decrease in the driving ability of a driver.

However, the most advanced and expensive systems constituted by a plurality of devices including these high-level technologies need to be equipped to realize a safe and secure stop of a running vehicle after lowering of an awakening state or a loss of consciousness of a driver by controlling the foregoing sensing system in an integrated manner. Accordingly, a large price barrier still exists for the commercial use.

Particularly, when a driver of a large-sized omnibus such as a bus and a long distance bus (Coach) loses consciousness during high-speed running of the vehicle, the vehicle comes into an uncontrollable state, and may cause not a minor accident but a serious accident influencing many passengers and running vehicles around the vehicle. For avoiding this problem, it is assumed to introduce an emergency stop button equipped on a train or the like, and an emergency stop control button corresponding to guidance-related control of the train or the like, as a means for allowing a passenger or an alternate driver having noticed the abnormal condition of the driver to perform a prompt accident avoidance operation so as to reduce or avoid a serious accident.

CITATION LIST

Patent Literature

PTL 1: JP 8-268287 A

SUMMARY OF INVENTION

Technical Problem

However, when the emergency stop button is introduced to a vehicle running on an ordinary road, a large impact is given to neighboring vehicles, pedestrians and the like, and may cause a serious secondary damage, unlike a vehicle running on a track such as a train and a monorail. Accordingly, it has been difficult to realize a safe emergency stop of an automobile.

The present disclosure developed in consideration of these circumstances realizes safe assistance for an emergency stop of a running vehicle.

Solution to Problem

According to an embodiment of the present disclosure, there is provided a method for decelerating a vehicle. The method includes monitoring a state of a driver of the vehicle, and causing a notification to be output based on the monitored state of the driver. The method further includes determining, by circuitry of an information processing apparatus and when operating in a manual operation mode, whether to cause the vehicle to decelerate after the notification is output. The vehicle is caused by the circuitry to decelerate based on the determination of whether to cause the vehicle to decelerate.

According to another embodiment of the present disclosure, there is provided a non-transitory computer-readable medium storing instructions which, when executed by a computer, causes the computer to perform a method for decelerating a vehicle. The method includes monitoring a state of a driver of the vehicle, and causing a notification to be output based on the monitored state of the driver. The method further includes determining, when operating in a manual operation mode, whether to cause the vehicle to decelerate after the notification is output. The vehicle is caused to decelerate based on the determination of whether to cause the vehicle to decelerate.

According to another embodiment of the present disclosure, there is provided an information processing apparatus, including circuitry configured to monitor a state of a driver of a vehicle, and cause a notification to be output based on the monitored state of the driver. The circuitry is configured to determine, when operating in a manual operation mode, whether to cause the vehicle to decelerate after the notification is output. The circuitry is further configured to cause the vehicle to decelerate based on the determination of whether to cause the vehicle to decelerate.

According to another embodiment of the present disclosure, there is provided an information processing apparatus, including means for monitoring a state of a driver of a vehicle, means for causing a notification to be output based on the monitored state of the driver, and means for determining, when operating in a manual operation mode, whether to cause the vehicle to decelerate after the notification is output. The information processing apparatus further includes means for causing the vehicle to decelerate based on the determination of whether to cause the vehicle to decelerate.

Advantageous Effects of Invention

According to an aspect of the present disclosure, an emergency stop of a running vehicle is more safely assisted.

DESCRIPTION OF EMBODIMENTS

A specific embodiment to which the present technology has been applied is hereinafter described in detail with reference to the drawings.

Figure 1:
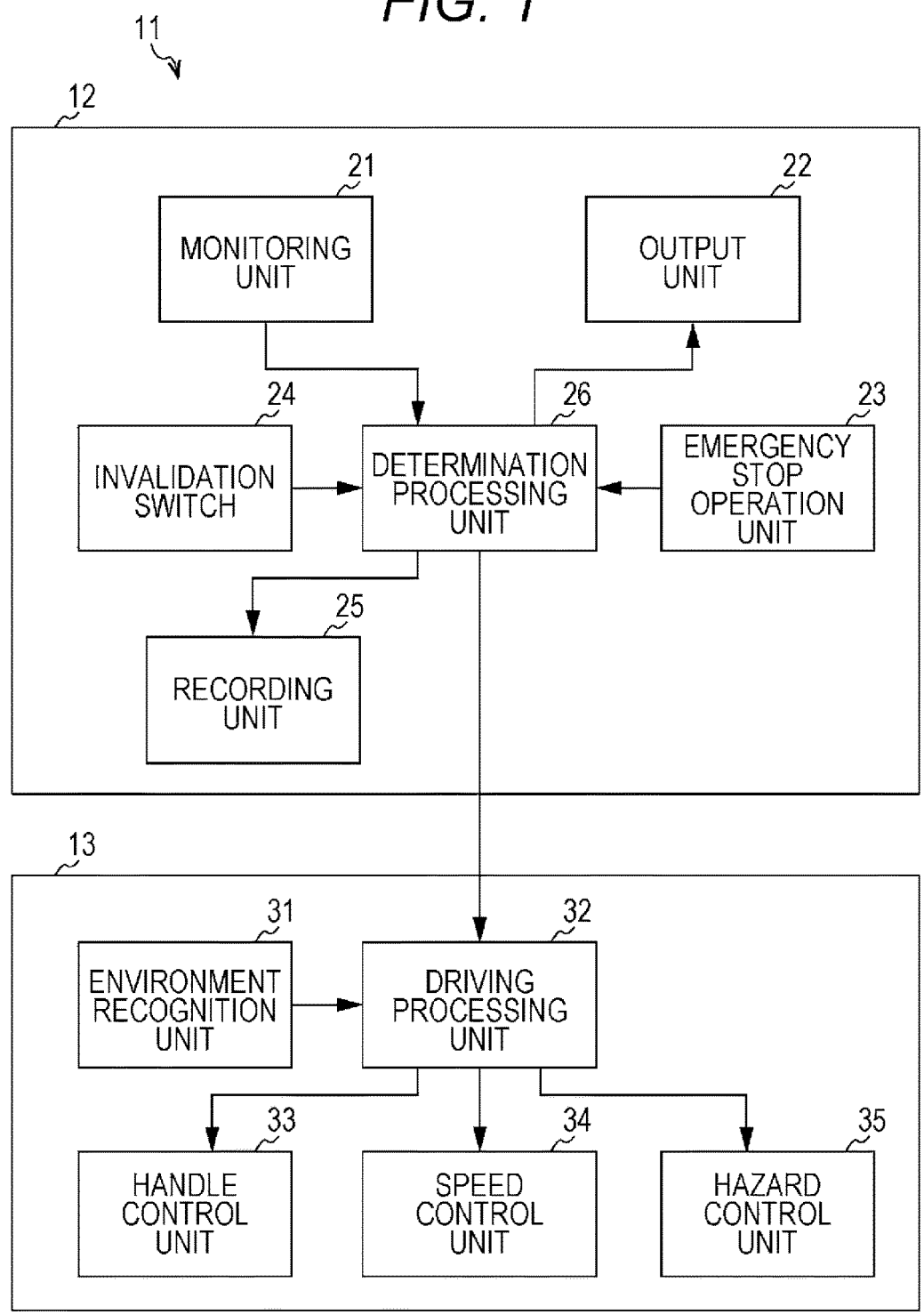
FIG. 1 is a block diagram illustrating a configuration example of a vehicle control device according to an embodiment to which the present technology has been applied.

FIG. 1 is a block diagram illustrating a configuration example of a vehicle control device according to a first embodiment to which the present technology has been applied.

A vehicle control device 11 illustrated in FIG. 1 controls a vehicle such that the vehicle comes to an emergency stop in accordance with a state of a driver, for example. As illustrated in FIG. 1, the vehicle control device 11 includes an emergency stop determination unit 12 which determines whether to bring the vehicle to an emergency stop, and a driving execution unit 13 which executes assisting driving at the time of an emergency stop of the vehicle.

The emergency stop determination unit 12 includes a monitoring unit 21, an output unit 22, an emergency stop operation unit 23, an invalidation switch 24, a recording unit 25, and a determination processing unit 26.

The monitoring unit 21 recognizes an awakening state of a driver based on continuous monitoring of the state of the driver, and supplies a driver status indicating the awakening state of the driver to the determination processing unit 26. For example, the monitoring unit 21 detects a sight line of the driver by using a camera 41 illustrated in FIG. 4 and described later, and recognizes the awakening state of the driver based on analysis of movement of the sight line which indicates, as statistical transitions, that the driver consciously recognizes an object, or that decrease in consciousness is developing. The determination of the awakening state of the driver made by the monitoring unit 21 will be detailed later.

The output unit 22 outputs various types of warnings under the control of the determination processing unit 26. For example, the output unit 22 visually displays the awakening state of the driver as a warning of fatigue or the necessity of a rest to the driver by using a lamp 44 illustrated in FIG. 4 and described later, lights a status warning lamp recognizable by passengers or an alternate driver of a long distance bus (Coach), or outputs an audio announcement from a speaker 43 illustrated in FIG. 4. Alternatively, the output unit 22 may provide wireless transmission to the outside.

The emergency stop operation unit 23 is disposed at a position in the vicinity of the driver's seat within the vehicle and easily operable by a third party other than the driver of the vehicle. For example, when the third party, who has noticed an audio warning from the output unit 22 and recognized the possibility of lowering of awakening of the driver based on the status warning lamp of the driver, operates the emergency stop operation unit 23, an emergency stop operation sequence starts for the determination processing unit 26. In accordance with the start of the emergency stop sequence, operation information necessary for assisting driving is expressly supplied from the speaker 43 (FIG. 4) to the third party staying within the vehicle. In addition, preparation established for the other all passengers at the time of an emergency stop, and a safety system established to enable braking actions are implemented. Furthermore, a process for guiding necessary procedures to be taken, such as handle operation, is initiated.

The invalidation switch 24 is disposed at a position in the vicinity of the driver's seat within the vehicle, and difficult to be operated by the third party other than the driver of the vehicle. For example, when the button of the emergency stop operation unit 23 is operated by the third party under the normal condition of the driver, the driver is capable of turning on the invalidation switch 24 to invalidate the previous emergency stop operation. In this case, the invalidation switch 24 supplies operation information to the determination processing unit 26 to indicate the fact that the invalidation operation has been performed.

The recording unit 25 stores an emergency stop operation for the emergency stop operation unit 23, an invalidation operation for the invalidation switch 24, a determination result made by the determination processing unit 26, and others as undeletable records. It is assumable that the driver continues driving by pressing the invalidation switch 24 even under a lowered awakening state. This reckless continuation of driving under the lowered awakening state may cause danger. For avoiding this problem, records may be left in an undeletable manner on a tachometer or the like for managing running of the vehicle, for example, to indirectly manage the reckless driving of the driver.

The determination processing unit 26 executes various types of determination processes based on the driver status supplied from the monitoring unit 21, operation information supplied from the emergency stop operation unit 23 to indicate that the emergency stop operation has been performed, and operation information supplied from the invalidation switch 24 to indicate that the invalidation operation has been performed.

The driving execution unit 13 includes an environment recognition unit 31, a driving processing unit 32, a handle control unit 33, a speed control unit 34, and a hazard control unit 35.

The environment recognition unit 31 recognizes the external environment of the vehicle by using devices such as a stereo camera and a laser radar, and supplies information indicating the external environment to the driving processing unit 32.

The driving processing unit 32 issues instructions to the handle control unit 33, the speed control unit 34, and the hazard control unit 35 when an emergency stop instruction for instructing an emergency stop of the vehicle is supplied from the determination processing unit 26 of the emergency stop determination unit 12 to perform a driving process for bringing the vehicle to an emergency stop.

The handle control unit 33 controls steering of the vehicle in accordance with the instruction issued from the driving processing unit 32. The speed control unit 34 controls the speed of the vehicle in accordance with the instruction issued from the driving processing unit 32. The hazard control unit 35 controls lighting of a hazard lamp provided on the vehicle in accordance with the instruction issued from the driving processing unit 32.

According to the vehicle control device 11 thus constructed, the determination processing unit 26 controls the output unit 22 such that the operation unit 23 outputs the awakening state of the driver in correspondence with the awakening state of the driver recognized by the monitoring unit 21. Accordingly, the third party other than the driver is capable of operating the emergency stop operation unit 23 when the awakening state of the driver is in a condition requiring an emergency stop. In this case, the determination processing unit 26 is capable of issuing, to the driving processing unit 32 of the driving execution unit 13, an instruction for bringing the vehicle to an emergency stop in accordance with the operation by the third party.

The vehicle control device 11 is further capable of performing a gradual stop process for stopping the vehicle when the emergency stop operation unit 23 is operated twice, as a process for stopping the vehicle more safely.

The vehicle control device 11 including the invalidation switch 24 is further capable of canceling the process executed by operation of the emergency stop operation unit 23 when the emergency stop operation unit 23 is operated even under the normal condition of the driver. Accordingly, an unnecessary emergency stop is avoidable, and safety further improves.

Figure 2:
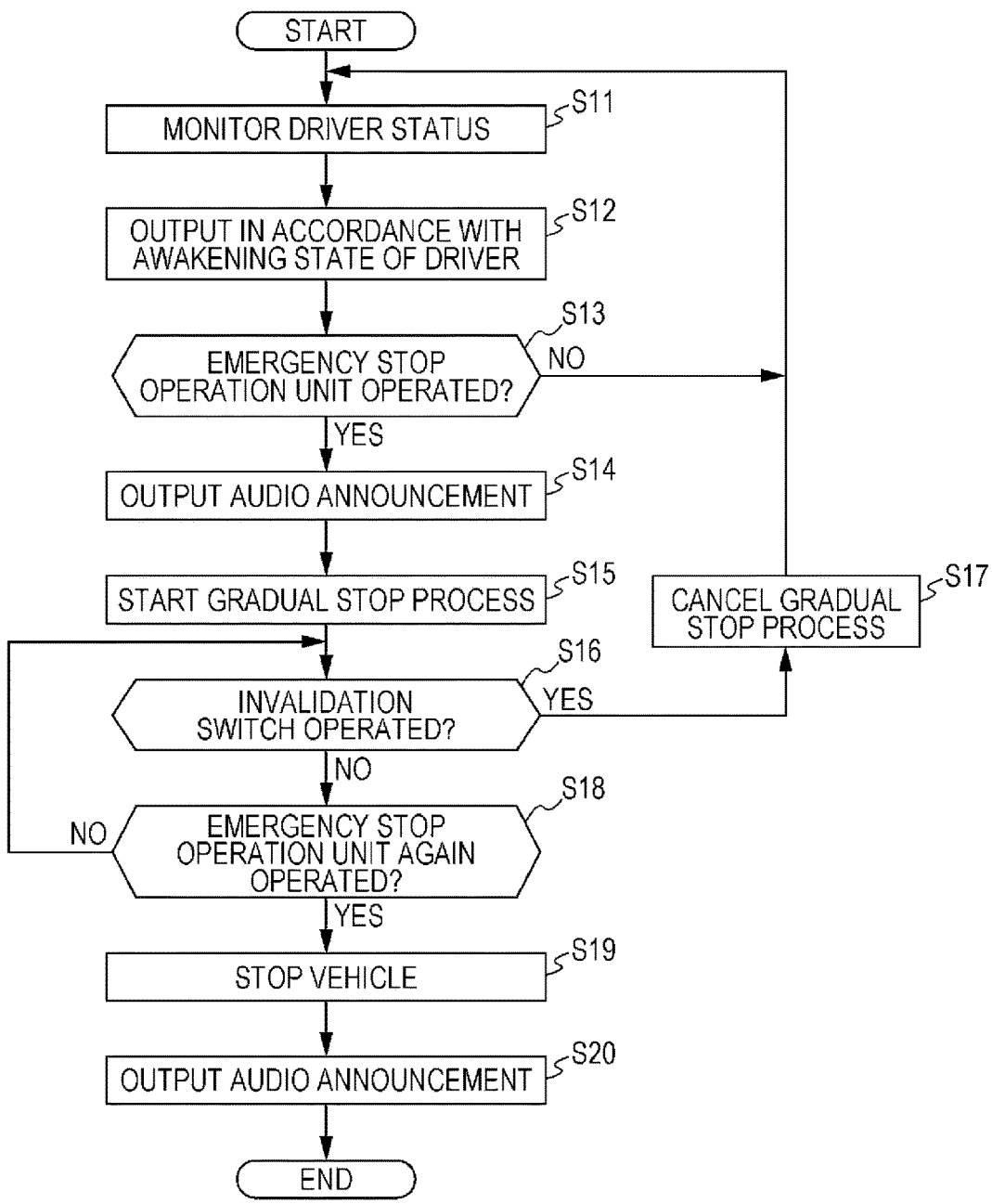
FIG. 2 is a flowchart illustrating a first emergency vehicle stop process executed by the vehicle control device.

A first emergency vehicle stop process executed by the vehicle control device 11 is hereinafter described with reference to a flowchart illustrated in FIG. 2. For example, the process starts in response to a start of driving of a vehicle carrying the vehicle control device 11.

In step S11, the monitoring unit 21 recognizes an awakening state of a driver based on continuous monitoring of the state of the driver, and supplies a driver status indicating the awakening state of the driver to the determination processing unit 26. The determination processing unit 26 monitors the awakening state of the driver based on the driver status.

In step S12, the determination processing unit 26 notifies the output unit 22 about the awakening state of the driver monitored in step S11, and controls the output unit 22 such that the output unit 22 generates output corresponding to the awakening state of the driver.

For example, the output unit 22 visually displays the awakening state of the driver to a fellow passenger or passengers by changing the color of a lamp (lamp 44 illustrated in FIG. 4 and described later) provided inside the vehicle. More specifically, the output unit 22 lights the lamp in green when the awakening state of the driver is a "normal" condition corresponding to the normal awakening state of the driver, and lights the lamp in yellow when the awakening state of the driver is a "caution" condition corresponding to a state of fatigue and requiring a rest. The output unit 22 lights the lamp in red when the awakening state of the driver is an "urgent rest or evacuation" condition corresponding to a state in an emergency. The output unit 22 blinks the lamp in red when the awakening state of the driver is an "emergency stop preparation and driver stop assistance as necessary" condition corresponding to an emergency support preferable state requiring support from a passenger or an alternate driver.

In step S13, the determination processing unit 26 determines whether or not the emergency stop operation unit 23 has been operated.

When the determination processing unit 26 determines that the emergency stop operation unit 23 is not operated in step S13, the process returns to step S11. Thereafter, similar processes are repeated. When the lamp lights in green to indicate that the awakening state of the driver is in the normal condition, for example, it is assumable that the passenger does not operate the emergency stop operation unit 23.

On the other hand, when the lamp lights in yellow or red to indicate that the awakening state of the driver is not in the normal condition, the passenger operates the emergency stop operation unit 23. In this case, the process proceeds to step S14 when the determination processing unit 26 determines that the emergency stop operation unit 23 has been operated in step S13.

In step S14, the determination processing unit 26 controls the output unit 22 such that the output unit 22 outputs an audio announcement. Based on this control, the output unit 22 outputs such an audio announcement "Mode change to emergency stop mode", for example. Moreover, the output unit 22 repeatedly outputs such an announcement "Emergency stop starts. Have safe posture and assist handle operation for stop at road edge". Furthermore, the output unit 22 outputs such audio announcements "Slow down, slow down. Press and hold emergency stop operation unit for emergency brake stop", and "Danger, danger. Hold on".

In step S15, the determination processing unit 26 instructs the driving processing unit 32 of the driving execution unit 13 to start a gradual stop process. In response to this instruction, the driving processing unit 32 controls the speed control unit 34 such that the speed control unit 34 starts deceleration of the vehicle. Moreover, the driving processing unit 32 controls the hazard control unit 35 such that the hazard control unit 35 lights the hazard lamp in a manner of emergency lighting (see FIG. 3 referred to later). Furthermore, the driving processing unit 32 sounds a not-shown horn by controlling the horn. In addition, the determination processing unit 26 records, on the recording unit 25, that the gradual stop process has started, and gives via a not-shown communication device a notification that an abnormal situation or an emergency situation has occurred.

In step S16, the determination processing unit 26 determines whether or not the invalidation switch 24 has been operated. As described above, the driver is capable of operating the invalidation switch 24 when the emergency stop operation unit 23 is operated under the normal condition of the driver.

When the determination processing unit 26 determines that the invalidation switch 24 has been operated in step S16, the process proceeds to step S17. In step S17, the determination processing unit 26 controls the driving processing unit 32 of the driving execution unit 13 such that the driving processing unit 32 cancels the gradual stop process. Based on this control, the gradual stop process is canceled. Thereafter, the process returns to step S11, where similar processes are repeated.

On the other hand, when the determination processing unit 26 determines that the invalidation switch 24 is not operated in step S16, the process proceeds to step S18.

In step S18, the determination processing unit 26 determines whether or not the emergency stop operation unit 23 has been again operated. When it is determined that the emergency stop operation unit 23 is not again operated, the process returns to step S16.

In step S15, the determination processing unit 26 starts the gradual stop process, and further performs a neighboring warning process. For example, the determination processing unit 26 controls the output unit 22 such that the output unit 22 outputs such an audio announcement "Control handle, and prepare for stop at edge or escape lane". After repeatedly outputting this audio announcement, the output unit 22 further repeatedly outputs audio announcements "Vehicle starts full stop by re-operation of operation unit", and "Press and hold for minimum distance stop".

When the passenger again operates the emergency stop operation unit 23 in accordance with these audio announcements, the determination processing unit 26 determines that the emergency stop operation unit 23 has been again operated in step S18. Then, the process proceeds to step S19.

In step S19, the determination processing unit 26 instructs the driving processing unit 32 of the driving execution unit 13 to stop the vehicle. In this case, the driving processing unit 32 controls the speed control unit 34 such that the speed control unit 34 decelerates the vehicle to a stop. When the vehicle stops based on this control, the process proceeds to step S20.

In step S20, the determination processing unit 26 controls the output unit 22 such that the output unit 22 outputs an audio announcement for caution. Based on this control, the output unit 22 outputs such an audio announcement "Apply parking brake after vehicle stop". The output unit 22 further outputs such an audio announcement "Start evacuation with full caution to following vehicle". The emergency vehicle stop process is now completed.

As described above, the vehicle control device 11 executes the emergency vehicle stop process to urge the third party to take early measures as an emergency action at the time of a loss of consciousness of the driver during driving, without the necessity of introduction of a high-level automatic driving system. Accordingly, occurrence of a serious accident is avoidable or reducible beforehand. More specifically, based on the notification given to the passengers of the vehicle or surroundings about the detected awakening state of the driver, the third party recognizes the abnormal condition in an early stage, and takes appropriate assisting measures in an initial stage. These actions contribute to reduction of accidents. Accordingly, a gradual stop, and a safe emergency stop is realizable by introduction of the vehicle control device 11 to a vehicle running on an ordinary road (such as large-sized omnibus, taxi, and passenger car).

Moreover, the vehicle control device 11 provided with the invalidation switch 24 is capable of invalidating operation of the emergency stop operation unit 23 operated by a passenger or a third party as mischief or malicious operation even under the normal condition of driving by the driver. When the invalidation switch 24 is disposed at a position invisible and difficult to be operated by an ordinary passenger, for example, the driver is capable of canceling the emergency vehicle stop process based on the normal determination of the driver.

There may be such a situation that the driver, who is under an unstable condition and possibly comes to an abnormal condition, continues driving while obstructing the stopping operation by a passenger or a third party. In this case, reckless driving may be continued with avoidance of an emergency stop. Accordingly, a configuration adopted for psychological prevention of this situation is such a configuration which records cancellation of the emergency vehicle stop process on a vehicle traveling data recorder (such as recording unit 25) specified under Road Traffic Law, and stores the records in an undeletable manner.

For example, it is effective to provide the vehicle control device 11 on a vehicle carrying advanced driver assistance systems (ADAS). There is a possibility that an emergency automatic stop does not operate in universal situations on a road on which a white line is not completely drawn, for example. In this case, appropriate assistance of steering may be required, in which condition an announcement given to indicate assisting operation to be performed by a third party in accordance with the road surface environment is considerably effective. Accordingly, the emergency stop operation unit 23 attached to the ADAS carrying vehicle is usable as support for the vehicle stop function when all the ADAS functions do not operate in universal situations.

When the driving ability of the driver lowers due to poor physical condition or for other reasons, a passenger or the like riding in the same vehicle and having noticed the abnormal condition is difficult to directly touch a braking device, for example, except for handle operation in conventional cases. In these circumstances, even when the fellow passenger of the vehicle notices the abnormal condition, the fellow passenger is not allowed to easily access the braking device of the running vehicle and perform accident avoiding operation. In case of a passenger car, a parking brake functions as braking assistance in an emergency, and a parking handle may be operable from the assistant driver's seat of the passenger car. According to a large-sized omnibus, however, operation is generally difficult to perform by an ordinary passenger. In addition, the large-sized omnibus is not so designed as to be operable by a third party, without positioning the parking brake at an expressly recognizable location for avoiding a hijack of the vehicle. Moreover, a braking device of a large-sized cargo truck on which an alternate driver may be placed is not so designed as to have arrangement operable by a third party. Accordingly, operation of a braking device by a person other than the driver is difficult during running, wherefore a considerable number of difficulties are produced in performing a series of driving operations from removal of the driver from the driver's seat to a stop of the vehicle during running of the vehicle. As a result, accidents are often caused once the driver of the running vehicle loses the control ability of the vehicle.

Furthermore, in the present circumstances, an emergency stop system is not generally introduced to an omnibus such as a bus, as a system for stopping the vehicle by a person other than the driver, unlike public transportation such as trains, subways, trams, and vehicles running on tracks. In recent years, technical development for realizing automatic driving of automobiles has been rapidly progressing with development of a white line recognition system, an obstacle recognition technology and others. However, in actual situations, complete automatic driving is not realizable on an ordinary road, wherefore a large number of technologies still need to be developed in reality. It is therefore assumable that accidents will be caused as well by a loss of the driving ability of the driver due to immediate physical deconditioning or the like in the future. Moreover, an omnibus is an expensive property in general, and is not easily replaceable with a vehicle provided with the latest equipment, in the condition that a long period is set before renewal. Accordingly, it is considered that a long time is still required before these expensive safety devices become substantially available on the market.

On the other hand, the vehicle control device 11 is more convenient and easily introducible as an emergency stop system incorporated in an existing vehicle. Moreover, even in case of the market of a region where introduction of the foregoing advanced safety driving device is not promoted, supply of the vehicle control device 11 to such a region is expected to contribute to prevention or reduction of a considerable number of serious accidents in the region. Furthermore, when a system corresponding to a level of a safety device attached to an existing vehicle is developed, this system will be more and more introduced to an omnibus corresponding to a long-distance transportation means in many regions in the world. In this case, safe and long-distance movement is realizable in a larger number of regions.

The simplest possible mechanism adoptable herein is such design which expressly provides a lever of a parking brake or the like at a position easily recognizable by a passenger and operable by a third party other than the driver, and allows the passenger to brake the vehicle. However, this design is not introduced in actual circumstances due to a problem of easy operation by the third party, for example. More specifically, when the hand parking brake or the like is expressly provided at a position easily recognizable by an ordinary passenger, the vehicle may be exposed to danger by unexpected operation performed by an abnormal person.

On the other hand, the vehicle control device 11 gives an audio emergency announcement to an operator or other passengers within the vehicle in accordance with a first operation, and urges preparation for an emergency stop started in repose to a second additional operation corresponding to the final vehicle stop operation under the safety system. Accordingly, safety of the third party performing emergency operation and many passengers is securable to the maximum level. The first operation in this context is not necessarily an operation performed first, but may be an operation performed at least before the second operation. In addition, an intermediate operation may be performed between the first and second operations.

The vehicle control device 11 may simply announce guidance for emergency stop preparation in the initial operation while lighting the hazard lamp, for example. In this case, guidance such as "Pull lever for emergency stop" may be given between the first and second operations. In addition, such guidance as "Emergency stop start in five seconds. Steer vehicle slowly along road until stop" may be automatically given by the system between the first and second operations.

According to this example, a button is used as a start input means for an emergency stop, in correspondence with an emergency button of a train. However, other input means such as a lever, a toggle switch, a handle, and a grip lever may be employed. In addition, this operation unit of the input means may be protected by a cover or the like for avoiding erroneous operations. Furthermore, an operation by both hands or a plurality of fingers may be required for a third party at the time of execution of a stop intervention operation so that the stop operation is executable only based on the necessity of secureness, with reduction of occurrence of simple erroneous operation.

When a passenger or the like operates a lever or others for a vehicle stop, the passenger operating the lever further presses the operation lever in a drastic manner in accordance with deceleration at the time of immediate deceleration of the vehicle. In this case, rapid braking is applied without a safety posture of the passenger, in which condition the body of the passenger may be thrown off the vehicle, or a lever operation more than intention may be input due to a plunge of the body in accordance with deceleration. Accordingly, unstable operation may expose the body of the passenger to danger.

For solving this problem, the vehicle control device 11 includes the emergency stop operation unit 23 constituted by a grip-type lever operable back and forth as a direction of operation with respect to the advancing direction of the vehicle. This lever is operated backward with respect to the advancing direction of the vehicle at the time of instruction of a start of an emergency stop operation. In this case, operation for pulling the lever in the direction of deceleration is a reasonable action from an intuitive viewpoint, similarly to an action of pulling reins at the time of riding on a horse. Particularly, a securer and more prompt determination is expected to be made for performing securer operation when audio guidance is simultaneously given. The emergency stop operation unit 23 is so designed as to increase the degree of initial braking in accordance with a shift amount or force of the lever operation or grip operation.

The vehicle control device 11 thus structured is capable of supplying a means for notifying a considerable number of passengers within an omnibus about the abnormal state of the driver in an early stage before a start of abnormal running when the driver loses the driving ability in the vehicle. Accordingly, a third party is capable of starting measures which should be taken in an emergency in an early stage. In addition, a neighboring passenger or the like notices the abnormal condition of the driver in an early stage as necessary, and starts and executes an emergency stop more safely by operating a means for bringing the corresponding vehicle to an emergency stop in accordance with the degree of necessity of the emergency, so that the vehicle can be stopped more safely at the time of the abnormal condition. Moreover, the driver status display or records are taken for offering an effect of reduction of reckless and thoughtless continuation of driving under a fatigue condition. In contradiction to this effect, it is assumable that a third party intentionally performs vehicle stop operation. However, a risk of obstruction to the normal driving caused by an abnormal person is avoidable by providing the function for canceling the sequence of the emergency stop under the normal condition of the driver.

Lighting of the hazard lamp at the time of execution of an emergency vehicle stop process by the vehicle control device 11 is hereinafter described with reference to FIG. 3.

Figure 3:
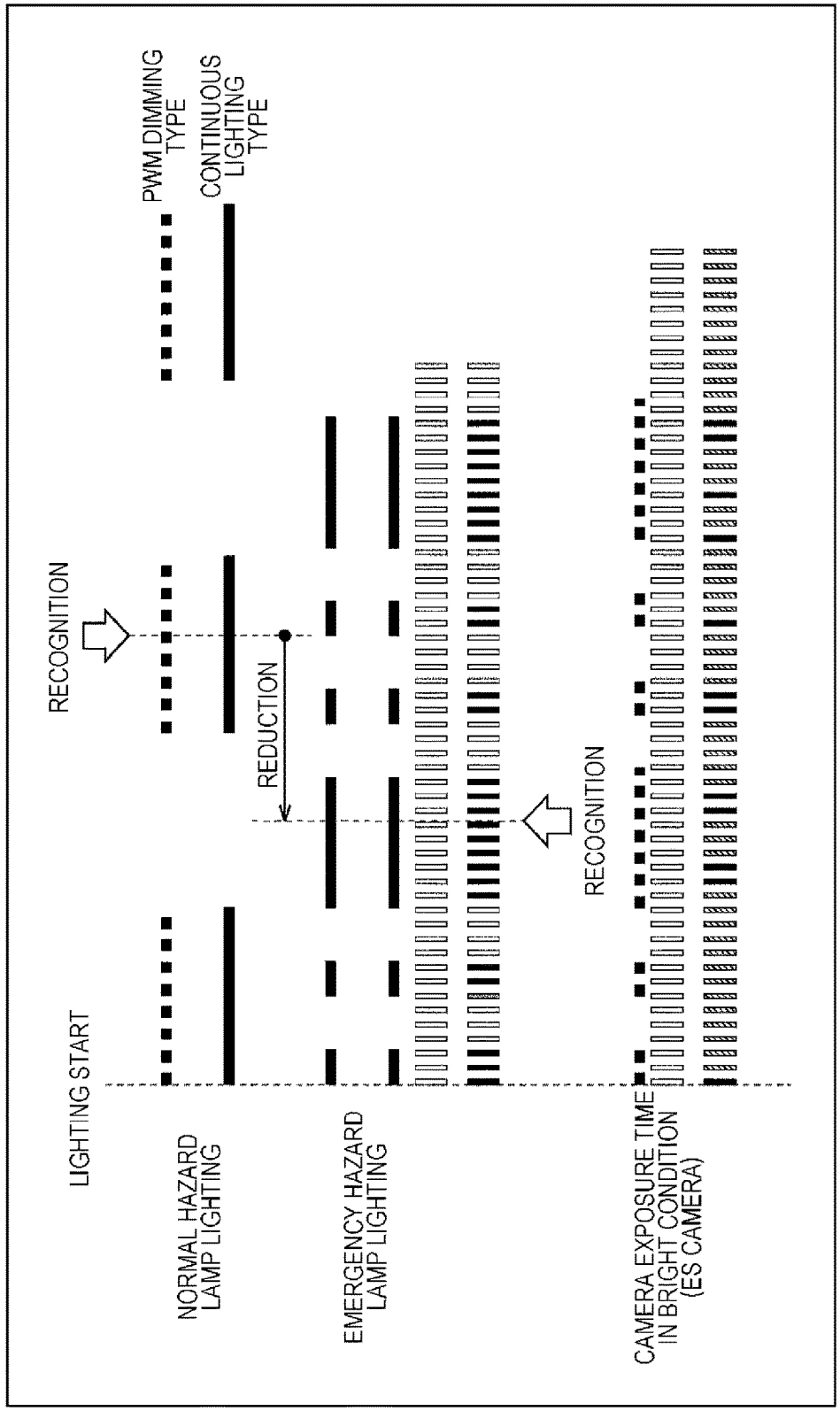
FIG. 3 is a view illustrating lighting of a hazard lamp when an emergency vehicle stop process is performed.

FIG. 3 illustrates lighting of the hazard lamp in the normal condition, lighting of the hazard lamp in the emergency condition, and a camera exposure time (ES camera) in a bright condition, in this order from the upper side.

In an emergency situation, for example, notification about the occurrence of an emergency stop along with sudden braking at the time of abnormal driving needs to be given to a driver of the following vehicle within the shortest possible time.

Accordingly, the vehicle control device 11 repeatedly lights the hazard lamp at the time of an emergency, in such a manner as to emit short-period light twice and long-period light once. This lighting of the hazard lamp at the time of an emergency allows the driver of the following vehicle to confirm first recognition by the second lighting, thereby shortening a delay of confirmation of recognition in comparison with lighting of the hazard lamp in the normal condition.

There is a possibility in the future, that the following vehicle carries an operation assisting system which recognizes the front using a monocular camera, depending on the equipment of the following vehicle. For secure recognition and identification, and secure notification to the system within a short time without a loss, guidance and caution are given in a blinking cycle shorter than a blinking cycle of an ordinary and widespread hazard lamp. Subsequently, the hazard lamp lights once for a long cycle corresponding to a cycle of the ordinary hazard lamp after high-speed blinking, and again repeatedly blinks twice or more at high speed for the purpose of continuous caution of identification as a special abnormal mode.

Moreover, the lighting period of the short-period light emission and the long-period light emission is set to continuous lighting at least for two cycles of 1/30 as an ordinary cycle of a camera, not using PWM lighting in view of light emission efficiency and life. Accordingly, even a camera system detecting an object with an intermittent exposure is capable of achieving secure detection without an oversight.

Even in case of a PWM dimming-type hazard lamp, a continuous light emission mode is used at the time of emergency display for securing camera detection. Accordingly, the hazard braking lamp control blinks in the continuous light emission mode in the non-blinking period for more securely avoiding oversight by a camera-type emergency stop device carried on the following vehicle.

There are currently proposed many methods as means for detecting state recognition or consciousness decrease of the driver. For example, there are known a device for detecting drowsy driving based on analysis of movement of the head detected by the posture of the head, a method for detecting sleeping and awakening state of the driver based on the condition of the eyelids and analysis of this condition, a driving fatigue and attentiveness detection device based on analysis of the degree of operation stability of steering and accelerator and brake pedals, and a fatigue degree detection device for monitoring body odor, for example.

However, none of these methods recognizes an obstacle corresponding to an obstructive factor for running by the driver, nor a direct individual consciousness state of the driver concerning the corresponding obstacle. These methods only detect a tendency such as statistical decrease in consciousness, and therefore are considered as insufficient methods for making a determination for an emergency stop of a vehicle. Accordingly, an emergency brake suddenly applied in an environment containing a mixture of ordinary vehicles other than full-automatic driving vehicles is a dangerous action, in which condition the degree of consciousness of the driver for recognizing a running obstacle and a lane for running needs to be more accurately determined for a transition to a stop or other steering modes in accordance with the awakening state of the driver. From this viewpoint, the use of sight line recognition concerning the driver is an effective method.

More specifically, the driver does not fix his or her eyes on an entire object which may become a running obstacle for the vehicle. When an attention is paid to this point, whether the driver consciously recognizes the object, or decrease in the consciousness of the driver is developing, is recognizable based on statistical transitions. An ordinary healthy person drives while unconsciously surveying a wide range and obtaining information on a lot of unspecified and complicated environments.

Accordingly, in urban areas or the like where many complex obstacles are present, eyeball movement occurs in a direction corresponding to an obstacle not during static visual recognition of an obstacle by the eyeballs, but in a condition of frequent movement. In this case, the eyeball rotational movement decelerates as an object comes closer to the vicinity of the center of the direction corresponding to the sight line. Particularly, eye focusing delays when the object is a finite-length object. In this case, decelerated movement which causes an eyeball stop or semi-stop occurs in a stage shifting to recognition with consciousness.

More specifically, at the time of an automatic evacuation action from a dangerous object or the like, a person does not necessarily start the evacuation action after complete visual recognition of the object with the eyes focused on the object. Particularly, in case of a wide angle range not covered by ordinary eyeball movement, the eyeballs initially capture a capture target while rotating the head, and quickly finish tracking of the capture target before the end of rotation of the head. In this case, the head movement is canceled with the eyeball rotational movement when a (cone area of) the sight line captures the object. Accordingly, the driver is allowed to make a determination corresponding to conscious recognition of an obstacle, i.e., corresponding to the normal awakening state, when the corresponding obstacle and the direction of the sight line coincide with each other completely or within a certain offset.

The degree of attention of the driver in the current state concerning the neighboring condition is recognizable by creating a correlation between a direction detection value obtained based on sight line recognition, and a light spot direction corresponding value of a driver and an object based on a vehicle neighboring obstacle recognition obtained using another device, creating this correlation for each of drivers, regularly calibrating detection accuracy, and monitoring the transitions.

For example, the most effective means is correlation transition monitoring of sight line recognition of the driver, and another sensor linked with the sight line recognition. For obtaining the awakening state of the driver with high accuracy, and for more precisely recognizing transitions of the state recognition ability of the driver concerning the obstacle, it is effective to track a tendency of coincidence between the direction of the sight line of the driver where the visual lines of the driver cross each other, and the position of the recognized object on the road surface obtained by a millimeter-wave radar, a laser radar, or a stereo or single camera, for example, or a tendency of decrease in instantaneous observation eyeball search movement of the driver concerning the obstacle based on regular observation of statistical transitions.

Accordingly, it is preferable that the vehicle control device 11 adopts a method for recognizing the state of the driver by using a camera within the vehicle for sight line recognition of the driver.

The interior of the vehicle equipped with the vehicle control device 11 is hereinafter described with reference to FIG. 4.

Figure 4:
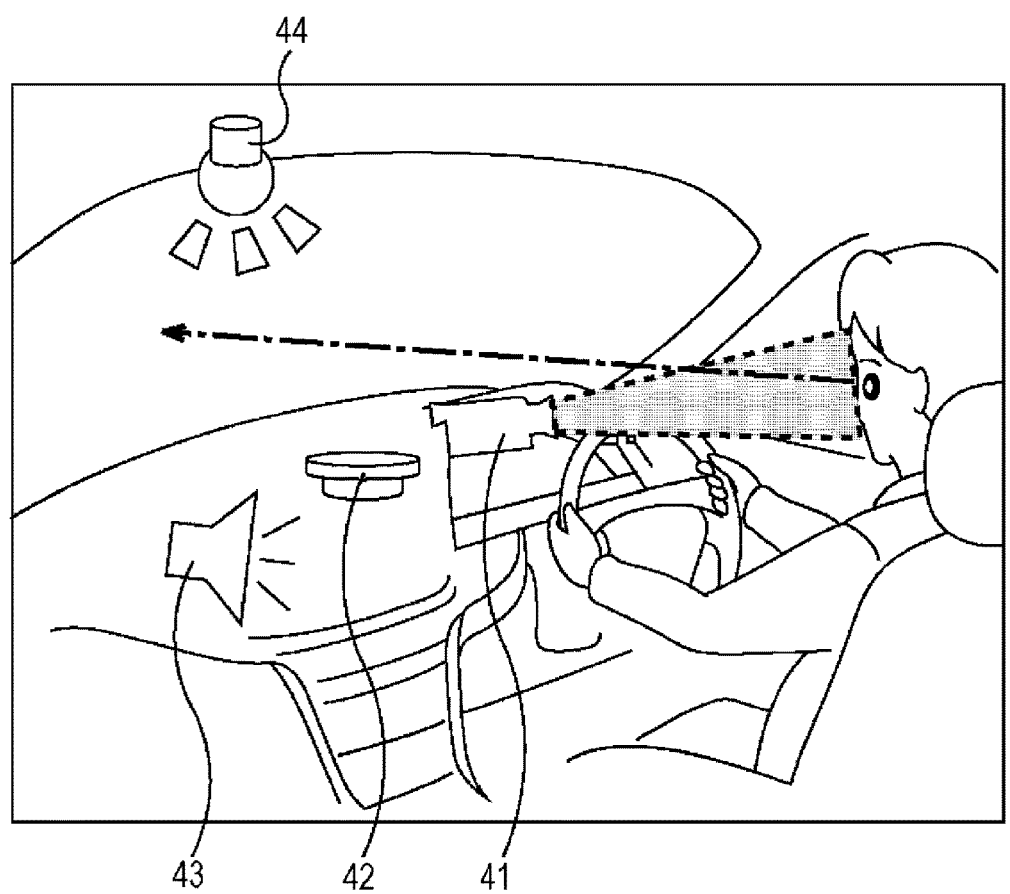
FIG. 4 is a view illustrating an interior of a vehicle provided with the vehicle control device.

As illustrated in FIG. 4, the camera 41, an emergency stop operation unit 42, the speaker 43, and the lamp 44 are disposed inside the vehicle. FIG. 4 only illustrates a part of the interior of the vehicle, and does not show the invalidation switch 24, for example, which is disposed at a position invisible and not easily accessible by a fellow passenger.

The camera 41 is disposed in such a position as to image the face of the driver. For example, an image obtained by the camera 41 is supplied to the monitoring unit 21, and used by the monitoring unit 21 for sight line recognition of the driver to recognize the state of the driver (monitoring of sight line attention).

The emergency stop operation unit 42 corresponds to the foregoing emergency stop operation unit 23 illustrated in FIG. 1.

The speaker 43 connected with the output unit 22 outputs an audio announcement discussed above.

The lamp 44 connected with the output unit 22 emits light in colors corresponding to the awakening state of the driver (green, yellow, red, and blinking red) as described above.

The monitoring unit 21 may obtain not only sight line recognition of the driver as discussed herein, but also reactional behaviors of the driver, such as operation transition observation concerning the vehicle accelerator pedal operation state, the brake pedal operation state, the clutch operation state, the handle operation state, and others input to various types of vehicle control units, and reactional behaviors concerning the head posture state of the driver, movement tracking of the sight line of the driver, and sight line saccade analysis, so as to detect lowering of awakening based on a change of the awakening state in accordance with a change of the period of the high awakening state. When awakening lowers, for example, deviation of the optimum steering amount or vehicle speed starts increasing due to decrease in consciousness during driving. In this case, the driver repeats sudden correcting actions to correct the deviation, or increases other unnatural and sudden actions different from normal smooth steering. In addition, according to general saccades of a sight line, actions tracking an object are repeated little by little at high speed. However, the saccades for tracking an obstacle or the like generally become slower in the lowered awakening state.

More specifically, the awakening status of a driver of a vehicle provided with a sight line recognition function and a vehicle forward obstacle recognition device is determinable by tracking a directional change of the sight line of the driver, simultaneously with monitoring of transitions of the degree of instantaneous coincidence between the sight line and the direction of an obstacle with respect to the driver estimated based on position analysis of the obstacle in the vehicle advancing direction, and further monitoring of stability transitions of so-called sight line saccades corresponding to high-speed movement of the sight line. During running with ordinary stable steering, vehicles present frontward with respect to the self-vehicle advancing direction, for example, advance in the same direction as the direction of the self-vehicle, in which condition the neighboring environment moves with a velocity vector in the opposite direction with respect to the direction of the velocity vector of the self-vehicle. Accordingly, the driver continues driving while shifting the sight line to both the vehicles driving ahead and the neighboring environment.

Analysis of a sight line described below is effective as a means for awakening state determination of the driver. The driver does not see all pieces of information on the environment for a certain period during actions of actual running. In actual circumstances, the driver repeatedly shifts the sight line for recognition of a front obstacle or of environmental position and shape relations by quickly moving the sight line in accordance with current situations, and in accordance with experiments, environmental recognition ability, and other current abilities of the driver, for example, in consideration of the degree of effects on the vehicle of the driver. According to more detailed examination of the monitoring of the degree of coincidence between the direction of the obstacle with respect to the driver detected by the foregoing vehicle forward obstacle recognition device and the direction of the sight line of the driver, it is found that the sight line of the driver needs to be shifted to an obstacle candidate as a subsequent action.

The saccades in this context are actions for shifting the direction of a central sight line of a person at high speed to a direction assumed to be a caution-needed direction in a peripheral vision. A salience map is a method for estimating a position easily attracting attention of a person within an image.

When the direction of the forward obstacle is detected by the ADAS system carried on the vehicle, for example, determination of awakening of the driver based on recognition of movement of the sight line of the driver in this manner is expected to produce such effects as time-series analysis monitoring based on a correlation between the sight line of the driver and an obstacle recognition device, and time-series evaluation changes of quickness evaluation points in saccades of the sight line of the driver. In any cases, the driving environment recognition ability of the driver exhibits physical characteristics peculiar to the driver, wherefore the state determination is allowed to utilize determination threshold learning (monitoring learning) of consciousness state lowering points concerning the characteristics of the driver.

Furthermore, the monitoring unit 21 may reduce the monitoring intervals of the awakening state of the driver when the determination processing unit 26 recognizes a sign of lowering of the awakening state of the driver. In this case, the determination processing unit 26 may recognize changes of the awakening state of the driver with frequencies corresponding to the intervals of the monitoring. In this case, early recognition of the lowered awakening state of the driver is realizable.

A second emergency vehicle stop process executed by the vehicle control device 11 is hereinafter described with reference to a flowchart illustrated in FIG. 5. For example, the process starts in response to a start of driving of a vehicle carrying the vehicle control device 11.

In step S31, the monitoring unit 21 recognizes the awakening state of the driver by continuously monitoring the state of the driver, and supplies a driver status indicating the awakening state of the driver to the determination processing unit 26. The determination processing unit 26 monitors the awakening state of the driver based on the driver status. At this time, the determination processing unit 26 continuously records the driver status on the recording unit 25. In this case, the monitoring unit 21 is capable of continuously monitoring the driver status based on the handling operation stability, the accelerator pedal operation stability, the face posture recognition, the degree of stability of statistical behaviors such as sight line statistical behavior stability of the driver, and a fatigue and awakening degree detector, for example.

In step S32, the determination processing unit 26 supplies to the driver such feedback as improvement of the awakening state of the driver, and an instruction of a rest to the driver in accordance with the awakening state of the driver monitored in step S31.

In step S33, the determination processing unit 26 determines whether or not the driver has ability for continuing driving after the feedback supplied to the driver in step S32. When the determination processing unit 26 determines that the driver has the ability for continuing driving in step S33, the process returns to step S31, where similar processes are repeated.

On the other hand, when the determination processing unit 26 determines that the driver does not have the ability for continuing driving in step S33, the process proceeds to step S34. At this time, the determination processing unit 26 changes the awakening state of the driver to be given to the output unit 22 as notification, such that the awakening state changes from "normal" to "caution" or "urgent rest or evacuation", and controls the output unit 22 such that the output unit 22 outputs an alarm of an audio announcement as necessary.

In step S34, the determination processing unit 26 searches for an emergency stop work area nearby based on route information, map information, the current position and the like, and determines whether or not the vehicle can come to an emergency stop based on the search result.

When the determination processing unit 26 determines that an emergency stop is not allowed in step S34, the process proceeds to step S35. When the determination processing unit 26 determines that an emergency stop is allowed, the process proceeds to step S36.

In step S35, the determination processing unit 26 determines whether or not an emergency stop is necessary. When it is determined that an emergency stop is necessary, the process proceeds to step S36.

In step S36, the determination processing unit 26 instructs the driving processing unit 32 of the driving execution unit 13 to perform the emergency vehicle stop process. After the driving processing unit 32 brings the vehicle to an emergency stop in accordance with the instruction, the process ends.

On the other hand, when the determination processing unit 26 determines that an emergency stop is unnecessary in step S35, the process proceeds to step S37. In this case, a guidance evacuation stop is allowable instead of an emergency stop.

In step S37, the determination processing unit 26 instructs the driving processing unit 32 of the driving execution unit 13 to execute a deceleration evacuation running stop mode.

In step S38, the driving processing unit 32 continues running while decelerating the vehicle. Then, the driving processing unit 32 allows the vehicle to run in accordance with handle guidance by the driver, or handle guidance by a passenger based on a guide instruction toward a safety zone where the vehicle is allowed to stop safely, and brings the vehicle to a stop in the safety zone to finish the process.

As described above, the vehicle control device 11 executes the emergency vehicle stop process to stop the vehicle immediately when the driver does not have the ability for continuing driving. Accordingly, occurrence of accidents and the like is avoidable.

Moreover, the vehicle control device 11 executes the deceleration evacuation running stop mode when an emergency stop is not allowed and unnecessary. In this case, the vehicle is allowed to run toward a safety zone and stop thereat.

Furthermore, the vehicle control device 11 is capable of strengthening state monitoring, and proceeding to the next step in the corresponding modes discussed below when detecting decrease in consciousness of the driver of the vehicle carrying a state recognition device.

For example, in a classification corresponding to a degree of fatigue, the driver is given recommendation of a rest, and guided to an evacuation stop. However, a large number of serious accidents may be caused by a sudden attack or the like. At the time of a sudden change of the awakening state to a certain level or lower, or repeated lowering of awakening, it is not expected to return to a full awakening state only by self-efforts of the driver, in such a condition as an epileptic fit and sleep apnea syndrome. In this case, there is a high possibility that the driver is in a sleep mode or in a faint.

Accordingly, at the time of detection of sudden lowering of the awakening state, or repeated decrease in awakening, a compulsive emergency condition announcement is immediately given inside the vehicle. In this case, the records are left on a tachometer. This recorded operation produces an effect of urging the driver to take a rest under constant indirect monitoring, and determines an excessive fatigue condition during continuous driving based on the records on the tachometer. Accordingly, a commercial vehicle operation company responsible for operation of vehicles on a public road is obliged to secure an appropriate rest for the driver. This method creates a mechanism for preventing neglect of repeated alarms during driving.

When the status of alerts of the driver awakening state is in the red condition (state requiring "urgent rest or evacuation" in an emergency), a passenger or an alternate driver prepares for an assistance prior to an emergency stop while waiting for completion of a self-emergency stop rest preparation mode by the driver.

When the driver does not start deceleration stop procedures to a self-evacuation lane even after the foregoing processes, the vehicle control device 11 is allowed to proceed procedures for automatic evacuation road edge stop while giving such an emergency stop announcement ("Emergency stop. Hold on" or other messages).

For example, in case of the vehicle control device 11 capable of communicating with the outside as a part of a remote control operation system, the vehicle control device 11 is capable of issuing an operation remote control instruction such as a rest, or giving a running limitation in a lowered awakening state, in accordance with an instruction from a remote control operation system.

Figure 6:
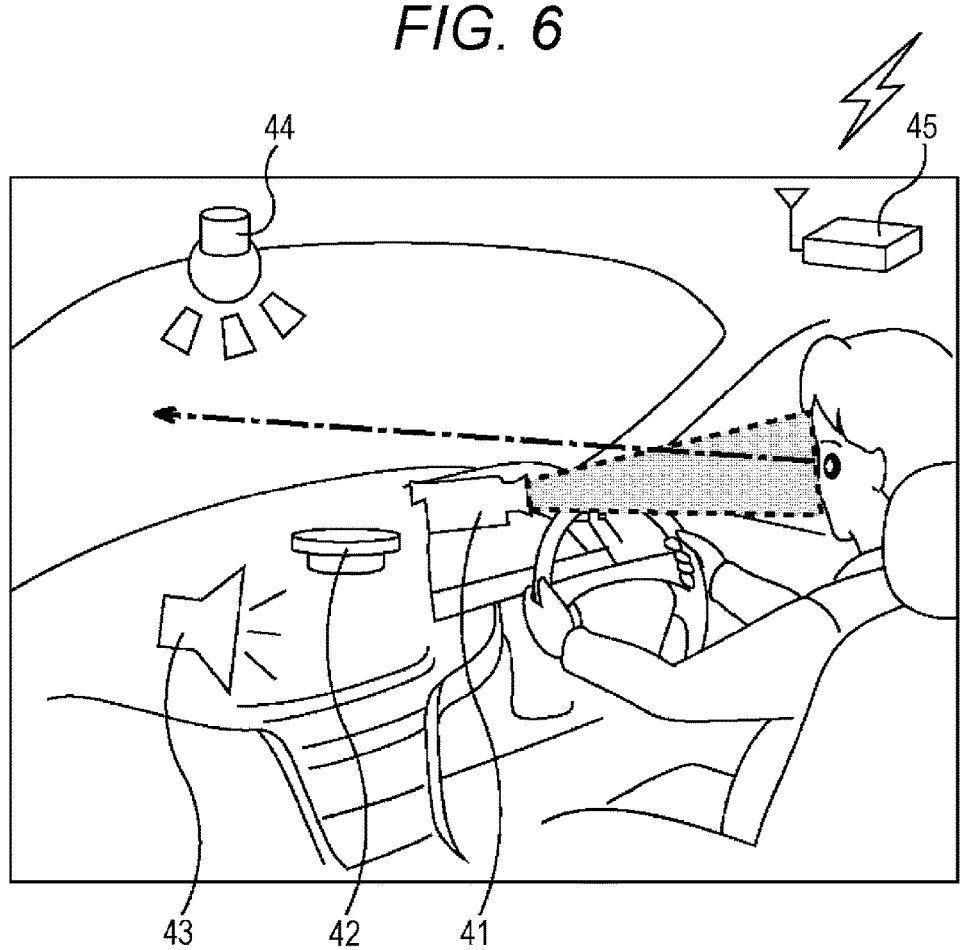
FIG. 6 is a view illustrating an interior of a vehicle provided with the vehicle control device.

For example, a communication device 45 may be provided on a vehicle equipped with the vehicle control device 11 as illustrated in FIG. 6. In this case, the vehicle control device 11 is capable of achieving communication via the communication device 45, and transmitting a safety stop instruction by remote control under management of a not-shown remote commercial vehicle operation system.

Figure 7:
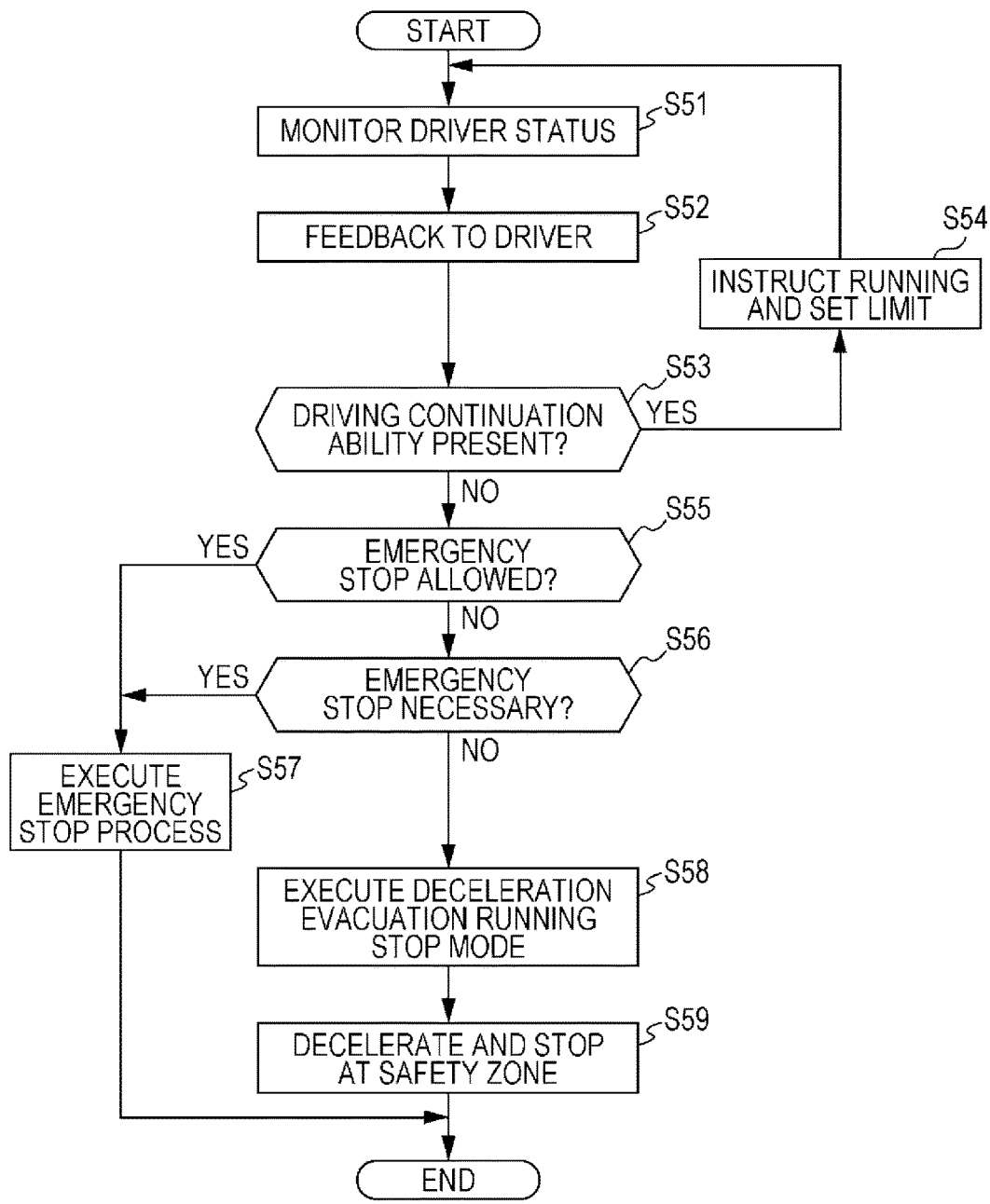
FIG. 7 is a flowchart illustrating a third emergency vehicle stop process executed by the vehicle control device.

A third emergency vehicle stop process executed by the vehicle control device 11 is hereinafter described with reference to a flowchart illustrated in FIG. 7. In the processes illustrated in the flowchart of FIG. 7, the points common to the processes in the flowchart of FIG. 5 are not described in detail.

Figure 5:
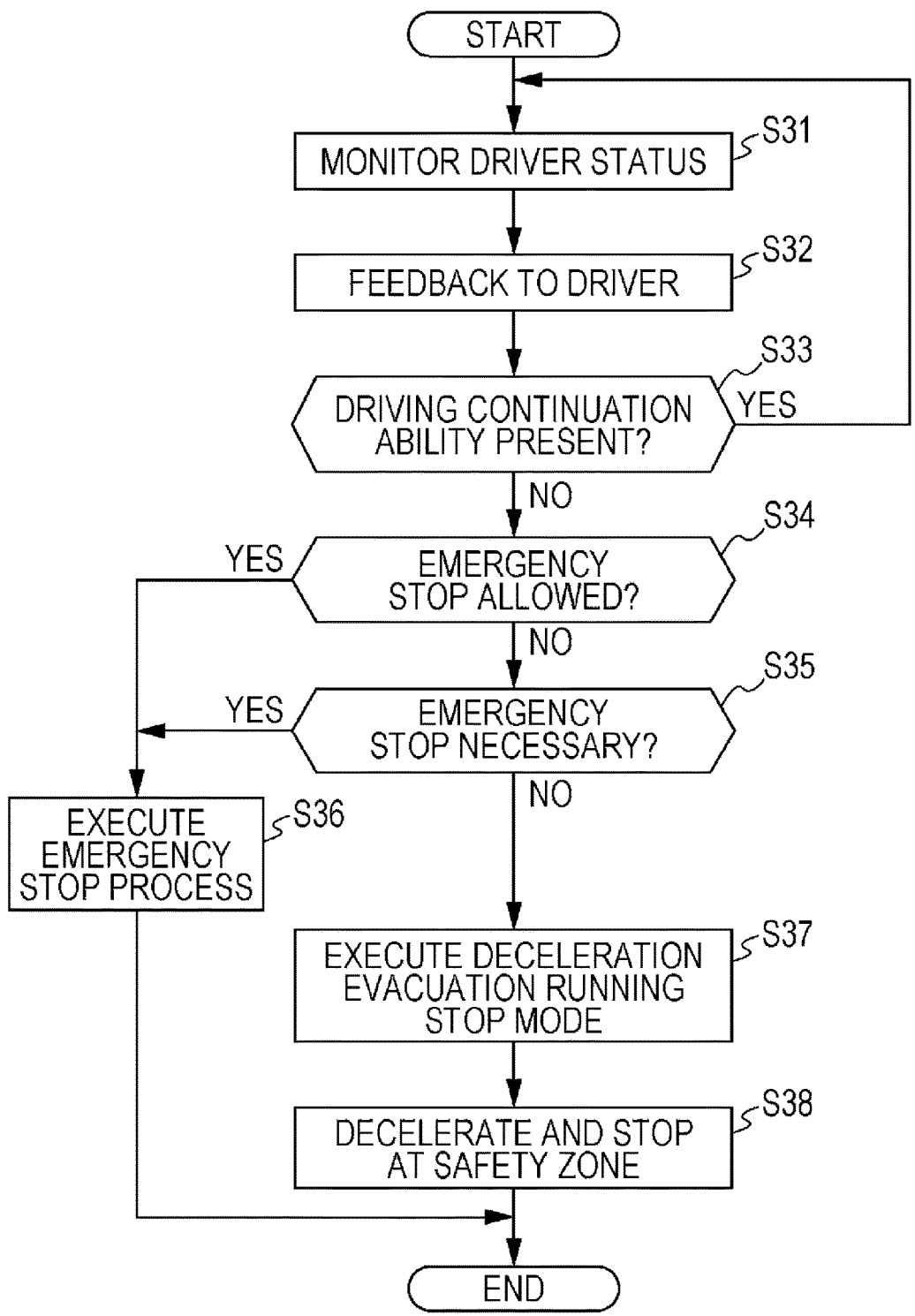
FIG. 5 is a flowchart illustrating a second emergency vehicle stop process executed by the vehicle control device.

In steps S51 through S53, processes similar to the processes in steps S31 through S33 in FIG. 5 are executed.

When the determination processing unit 26 determines that the driver has the ability for continuing driving in step S53, the process proceeds to step S54.

In step S54, the determination processing unit 26 communicates with the remote control operation system via the communication device 45, and notifies the remote control operation system about the driver status. Based on this notification, the remote control operation system is capable of issuing an operation remote control instruction for urging a rest while indicating an optimum rest point in an early stage in accordance with a running route, such as a parking area. In addition, the remote control operation system is capable of imposing a running limitation as necessary.

On the other hand, when the determination processing unit 26 determines that the driver does not have the ability for continuing driving in step S53, the process proceeds to step S55. In steps S55 through S59, processes similar to the processes from step S34 to S38 in FIG. 5 are executed to finish the processing.

As described above, the vehicle control device 11 lowers a running upper speed limit by controlling hardware to prevent reckless continuation of driving when it is determined that fatigue is accumulating based on the awakening state determination during running. Accordingly, the vehicle control device 11 constitutes a mechanism for prolonging the time required for reaching a destination as a result of the necessity of lowering the allowable maximum speed, and thereby constitutes a mechanism for allowing the driver to preferentially take a rest.

Continuation of running is allowed with cancellation of the running speed upper limit function for a specific vehicle. However, unnecessary cancellation is avoidable by retaining a limitation cancellation history as a target of a violation or a deduction point addition for insurance. When a certain rest is not taken at a rest spot, a speed limitation or the like is imposed to the vehicle by controlling hardware, for example, so as to contribute to prevention of reckless continuation of driving under accumulation of fatigue.

There is an extremely high possibility that an emergency stop of a vehicle leads to a serious secondary accident particularly in the environment of a metropolitan expressway. Accordingly, it is preferable that notification of a shift to a deceleration state is immediately given to the following vehicle, and that the following vehicle is simultaneously guided toward a lower interference zone such as a road edge while maintaining certain deceleration of the self-vehicle.

For example, it is expected that unmanned automatic driving is realized in all types of road environments in the future. However, in the current circumstances of road environments, such full-automatic evacuation driving is still considered difficult to realize. Products such as a white line deviation prevention system and an emergency automatic stop function have been already mass-produced, and available on the market. However, these products do not necessarily realize automatic running of an unmanned vehicle in all types of environments.

For lowering the possibility of the secondary damage caused by an emergency stop at the time of decrease in consciousness of the driver while effectively utilizing the maximum advantages of the equipped functions, it is preferable to prepare an emergency stop assisting system using audio guidance simultaneously with emission of a warning to passengers or an alternate driver in an early stage, and further perform a gradual vehicle stop while urging emergency assisting operation (by a third party such as the passenger and alternate driver) under the running state determined such that an automatic stop of automatic driving incorporated in the vehicle is difficult.

For spreading the vehicle control device 11, it is needed to provide such a mechanism which does not allow the driver to continue compulsory operation in a heavy fatigue state.

For example, the vehicle control device 11 includes the invalidation switch 24 to constitute a system for invalidating compulsive deceleration start operation based on an intention of a third party, and allowing continuation of driving based on an intention of the driver. However, for preventing serious accidents caused with knowledge of overwork, it is essential to constitute a mechanism for avoiding chronic abuses by regulation of rules, such as penal regulations and point addition to insurance.

For realizing this mechanism, the vehicle control device 11 retains, in the recording unit 25 corresponding to a recording and storing area where deletion of records is not allowed, such as an event recorder, a tachometer, and other equivalents, an intention of the driver that the driver operates the invalidation switch 24 for canceling the emergency vehicle stop process at the time of continuation of driving based on the intention of the driver, for example. This structure is expected to strengthen penal regulations concerning continuation of driving on purpose at the time of decrease in consciousness.

The respective processes described with reference to the foregoing flowcharts need not be processed in time series in the orders shown in the respective flowcharts, but may include processes executed in parallel or individually (such as parallel processes or processes for each object). The program may be processed by a single CPU, or by a plurality of CPUs for separate processing.

A series of processes described above (image processing method) may be executed either by hardware or software. When the series of processes are executed by software, programs constituting the software are installed from a program recording medium where the programs are recorded, to a computer incorporated into a dedicated hardware, or a general-purpose personal computer or the like capable of executing various functions under various types of programs installed to the computer.

Figure 8:
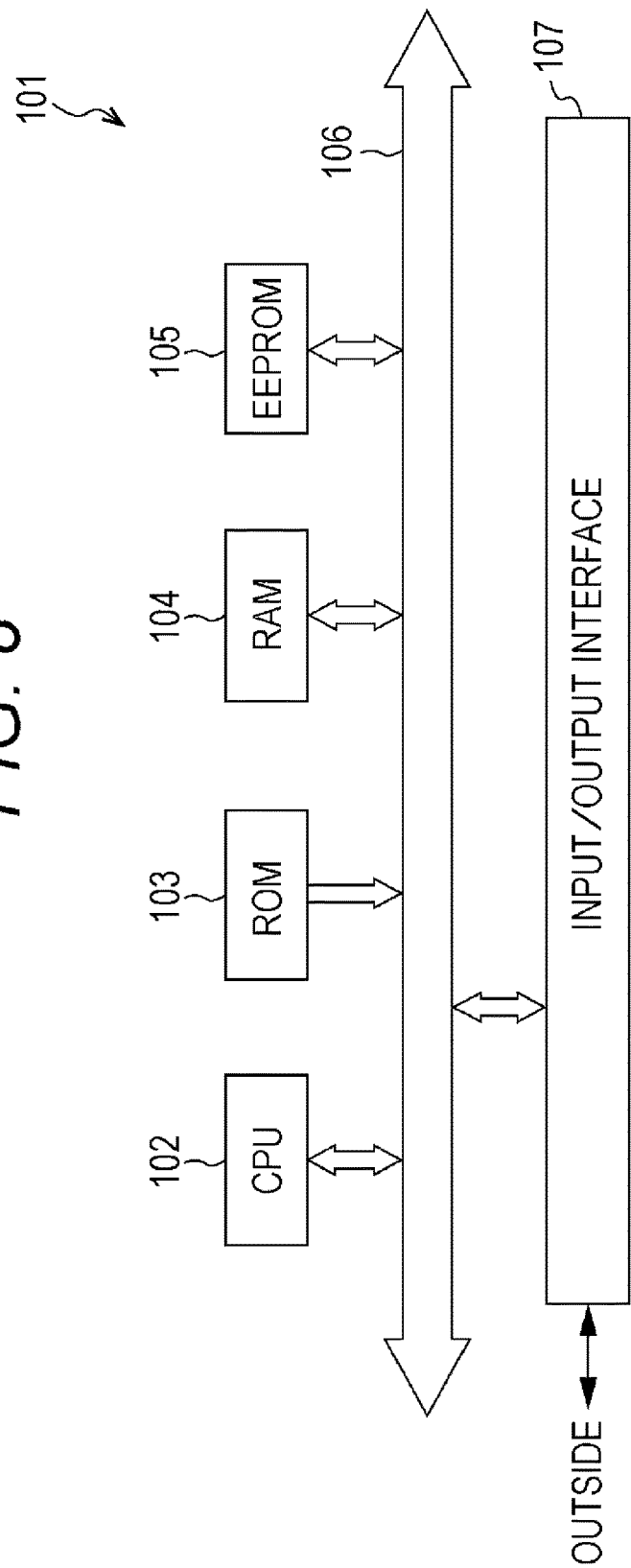
FIG. 8 is a block diagram illustrating a configuration example of a computer according to an embodiment to which the present technology has been applied.

FIG. 8 is a block diagram illustrating a configuration example of hardware of a computer which executes the series of processes described above under programs, and/or configured to implement one or a combination of the units described above with respect to FIG. 1.

According to the computer, a CPU (Central Processing Unit) 102, ROM (Read Only Memory) 103, RAM (Random Access Memory) 104, and EEPROM (Electronically Erasable and Programmable Read Only Memory) 105 are connected with each other via a bus 106. An input/output interface 107 is further connected with the bus 106 for connection to the outside via the input/output interface 107.

According to the computer thus constructed, the CPU 102 loads programs stored in the ROM 103 and the EEPROM 105, for example, into the RAM 104 via the bus 106 and executes the loaded programs to perform the series of processes described above.

The programs executed by the computer (CPU 102) are provided from the outside connected via the input/output interface 107, by using a package medium such as a magnetic disk (including flexible disk), an optical disk (such as CD-ROM (Compact Disc-Read Only Memory), and a DVD (Digital Versatile Disc)), a magneto-optical disk, and a semiconductor memory, or provided via a wired or wireless transmission medium such as a local area network, the Internet, and satellite digital broadcasting.

The present technology may have the following configurations.

(1) A method for decelerating a vehicle, the method including:
monitoring a state of a driver of the vehicle;
causing a notification to be output based on the monitored state of the driver;
determining, by circuitry of an information processing apparatus and when operating in a manual operation mode, whether to cause the vehicle to decelerate after the notification is output; and
causing, by the circuitry, the vehicle to decelerate based on the determination of whether to cause the vehicle to decelerate.

(2) The method according to feature (1), in which
the step of causing the notification includes causing the notification to be presented to a person that is not the driver, and
the notification indicates the state of the driver.

(3) The method according to feature (1) or (2), in which the notification is presented by a light that emits a predetermined color based on the monitored state of the driver.

(4) The method according to feature (2) or (3), in which
the step of determining includes determining whether a first instruction to stop the vehicle is received from the person that is not the driver after the notification is output; and
the step of causing the vehicle to decelerate includes causing the vehicle to decelerate based on a determination that the first instruction is received after the notification is output.

(5) The method according to feature (4), further including:
causing a warning to be provided inside the vehicle before causing the vehicle to decelerate.

(6) The method according to feature (4) or (5), further including:
determining whether a second instruction to stop the vehicle is received after the first instruction is received; and
causing the vehicle to stop based on a determination that the second instruction is received.

(7) The method according to any one of features (4) to (6), further including:
determining whether a third instruction to cancel the first instruction is received from the driver after the first instruction is received; and
canceling the deceleration of the vehicle based on a determination that the third instruction is received after the first instruction.

(8) The method according to any one of features (1) to (7), in which the notification includes feedback to the driver based on the monitored state of the driver, and
the method further comprises:
determining whether to cause the vehicle to perform an emergency stop, automatically causing the vehicle to perform an immediate stop based on a determination to cause the vehicle to perform the emergency stop, and
causing the vehicle to perform a guided manual stop based on a determination that the emergency stop is not to be performed.

(9) The method according to any one of features (1) to (8), further including: limiting a top speed of the vehicle based on the monitored state of the driver.

(10) The method according to any one of features (1) to (9), in which the step of monitoring comprises:
monitoring eye movement or a sight line of the driver.

(11) The method according to any one of features (1) to (10), further including: causing activation of at least one of hazard lights or a horn of the vehicle during the deceleration of the vehicle.

(12) The method according to feature (11), in which the hazard lights are activated such that a short period of light is emitted twice and a long period of light is emitted once.

(13) A non-transitory computer-readable medium storing instructions which, when executed by a computer, causes the computer to perform a method for decelerating a vehicle, the method including:
monitoring a state of a driver of the vehicle;
causing a notification to be output based on the monitored state of the driver;
determining, when operating in a manual operation mode, whether to cause the vehicle to decelerate after the notification is output; and
causing the vehicle to decelerate based on the determination of whether to cause the vehicle to decelerate.

(14) The non-transitory computer-readable medium according to feature (13), in which the step of causing the notification includes causing the notification to be presented to a person that is not the driver, and
the notification indicates the state of the driver.

(15) The non-transitory computer-readable medium according to feature (13) or (14), in which the notification is presented by a light that emits a predetermined color based on the monitored state of the driver.

(16) The non-transitory computer-readable medium according to feature (14) or (15), in which
the step of determining includes determining whether a first instruction to stop the vehicle is received from the person that is not the driver after the notification is output; and
the step of causing the vehicle to decelerate includes causing the vehicle to decelerate based on a determination that the first instruction is received after the notification is output.

(17) The non-transitory computer-readable medium according to feature (16), further including:
causing a warning to be provided inside the vehicle before causing the vehicle to decelerate.

(18) The non-transitory computer-readable medium according to feature (16) or (17), further including:
determining whether a second instruction to stop the vehicle is received after the first instruction is received; and
causing the vehicle to stop based on a determination that the second instruction is received.

(19) The non-transitory computer-readable medium according to any one of features (16) to (18), further including:
determining whether a third instruction to cancel the first instruction is received from the driver after the first instruction is received; and
canceling the deceleration of the vehicle based on a determination that the third instruction is received after the first instruction.

(20) The non-transitory computer-readable medium according to any one of features (13) to (19), in which
the notification includes feedback to the driver based on the monitored state of the driver, and
the method further comprises:
determining whether to cause the vehicle to perform an emergency stop, automatically causing the vehicle to perform an immediate stop based on a determination to cause the vehicle to perform the emergency stop, and causing the vehicle to perform a guided manual stop based on a determination that the emergency stop is not to be performed.

(21) The non-transitory computer-readable medium according to any one of features (13) to (20), further including:

limiting a top speed of the vehicle based on the monitored state of the driver.

(22) The non-transitory computer-readable medium according to any one of features (13) to (21), in which the step of monitoring comprises:

monitoring eye movement or a sight line of the driver.

(23) The non-transitory computer-readable medium according to any one of features (13) to (22), further including:

causing activation of at least one of hazard lights or a horn of the vehicle during the deceleration of the vehicle.

(24) The non-transitory computer-readable medium according to feature (23), in which the hazard lights are activated such that a short period of light is emitted twice and a long period of light is emitted once.

(25) An information processing apparatus, including:

circuitry configured to monitor a state of a driver of a vehicle;

cause a notification to be output based on the monitored state of the driver;

determine, when operating in a manual operation mode, whether to cause the vehicle to decelerate after the notification is output; and cause the vehicle to decelerate based on the determination of whether to cause the vehicle to decelerate.

(26) The information processing apparatus according to feature (25), in which the circuitry is configured to cause the notification to be presented to a person that is not the driver, and the notification indicates the state of the driver.

(27) The information processing apparatus according to feature (25) or (26), in which the notification is presented by a light that emits a predetermined color based on the monitored state of the driver.

(28) The information processing apparatus according to feature (26) or (27), in which the circuitry is configured to determine whether a first instruction to stop the vehicle is received from the person that is not the driver after the notification is output; and cause the vehicle to decelerate based on a determination that the first instruction is received after the notification is output.

(29) The information processing apparatus according to feature (28), in which the circuitry is configured to cause a warning to be provided inside the vehicle before causing the vehicle to decelerate.

(30) The information processing apparatus according to feature (28) or (29), in which the circuitry is configured to determine whether a second instruction to stop the vehicle is received after the first instruction is received; and cause the vehicle to stop based on a determination that the second instruction is received.

(31) The information processing apparatus according to any one of features (28) to (30), in which the circuitry is configured to determine whether a third instruction to cancel the first instruction is received from the driver after the first instruction is received; and cancel the deceleration of the vehicle based on a determination that the third instruction is received after the first instruction.

(32) The information processing apparatus according to any one of features (25) to (31), in which the notification includes feedback to the driver based on the monitored state of the driver, and the circuitry is configured to determine whether to cause the vehicle to perform an emergency stop, automatically cause the vehicle to perform an immediate stop based on a determination to cause the vehicle to perform the emergency stop, and cause the vehicle to perform a guided manual stop based on a determination that the emergency stop is not to be performed.

(33) The information processing apparatus according to any one of features (25) to (32), in which the circuitry is configured to limit a top speed of the vehicle based on the monitored state of the driver.

(34) The information processing apparatus according to any one of features (25) to (33), in which the circuitry is configured to monitor eye movement or a sight line of the driver.

(35) The information processing apparatus according to any one of features (25) to (34), in which the circuitry is configured to cause activation of at least one of hazard lights or a horn of the vehicle during the deceleration of the vehicle.

(36) The information processing apparatus according to feature (35), in which the hazard lights are activated such that a short period of light is emitted twice and a long period of light is emitted once.

(37) An information processing apparatus, including:

means for monitoring a state of a driver of a vehicle;

means for causing a notification to be output based on the monitored state of the driver;

means for determining, when operating in a manual operation mode, whether to cause the vehicle to decelerate after the notification is output; and means for causing the vehicle to decelerate based on the determination of whether to cause the vehicle to decelerate.

(38) The information processing apparatus according to feature (37), in which the means for causing the notification to be output causes the notification to be presented to a person that is not the driver, and the notification indicates the state of the driver.

(39) The information processing apparatus according to feature (37) or (38), in which the notification is presented by a light that emits a predetermined color based on the monitored state of the driver.

(40) The information processing apparatus according to feature (38) or (39), in which the means for determining determines whether a first instruction to stop the vehicle is received from the person that is not the driver after the notification is output; and the means for causing the vehicle to decelerate causes the vehicle to decelerate based on a determination that the first instruction is received after the notification is output.

(41) The information processing apparatus according to feature (40), further including: means for causing a warning to be provided inside the vehicle before causing the vehicle to decelerate.

(42) The information processing apparatus according to feature (40) or (41), further including:
means for determining whether a second instruction to stop the vehicle is received after the first instruction is received; and
means for causing the vehicle to stop based on a determination that the second instruction is received.

(43) The information processing apparatus according to any one of features (40) to (42), further including:
means for determining whether a third instruction to cancel the first instruction is received from the driver after the first instruction is received; and
means for canceling the deceleration of the vehicle based on a determination that the third instruction is received after the first instruction.

(44) The information processing apparatus according to any one of features (37) to (43), in which
the notification includes feedback to the driver based on the monitored state of the driver, and
the information processing apparatus further includes:
means for determining whether to cause the vehicle to perform an emergency stop, in which the means for causing the vehicle to decelerate
automatically causes the vehicle to perform an immediate stop based on a determination to cause the vehicle to perform the emergency stop, and
causes the vehicle to perform a guided manual stop based on a determination that the emergency stop is not to be performed.

(45) The information processing apparatus according to any one of features (37) to (44), further including:
means for limiting a top speed of the vehicle based on the monitored state of the driver.

(46) The information processing apparatus according to any one of features (37) to (45), in which
the means for monitoring monitors eye movement or a sight line of the driver.

(47) The information processing apparatus according to any one of features (37) to (46), further including:
means for causing activation of at least one of hazard lights or a horn of the vehicle during the deceleration of the vehicle.

(48) The information processing apparatus according to feature (47), in which the hazard lights are activated such that a short period of light is emitted twice and a long period of light is emitted once.

The present technology may have the following configurations.

(1)
A vehicle control device including:
a monitoring unit that monitors a state of driver driving a vehicle;
a determination processing unit that performs a determination process for recognizing an awakening state of the driver based on a monitoring result of the monitoring unit, and determining the awakening state of the driver; and
an output unit that gives an output for expressly warning a third party other than the driver about lowering of the awakening state of the driver when the determination processing unit determines that the awakening state of the driver has lowered.

(2)
The vehicle control device according to (1) noted above, wherein the output unit warns that the awakening state of the driver has lowered by using any one of a method for outputting an alarm or audio guidance, a method for lighting or blinking visual warning display, and a method for providing wireless transmission to an outside.

(3)
The vehicle control device according to (1) or (2) noted above, wherein
the monitoring unit outputs a monitoring result based on head posture monitoring or sight line attention monitoring of the driver, and
the determination processing unit performs the determination process based on at least either one of the monitoring results.

(4)
The vehicle control device according to any one of (1) through (3) noted above, wherein
the monitoring unit constantly monitors a head action, a sight line action, an accelerator pedal operation, and a brake pedal operation of the driver, and
the determination processing unit recognizes a sequence of statistical stable actions peculiar to the driver in a normal awakening state through monitoring learning, and determines a deviation of actions due to lowering of awakening of the driver, or decrease in quickness of the driver to perform the determination process.

(5)
The vehicle control device according to any one of (1) through (4) noted above, wherein
the monitoring unit reduces intervals of the monitoring when the determination processing unit recognizes a sign of lowering of the awakening state of the driver, and the determination processing unit recognizes changes of the awakening state of the driver with frequencies corresponding to the intervals of the monitoring.

(6)
The vehicle control device according to (1) noted above, further including:
a driving execution unit that automatically operates a braking device of the vehicle, the driving execution unit provided in addition to ordinary brake pedal and parking brake that operate the braking device; and
an emergency stop operation unit that allows the third party to perform a starting operation for allowing the driving execution unit to operate the braking device of the vehicle.

(7)
The vehicle control device according to (6) noted above, wherein
the emergency stop operation unit is a press button provided with an erroneous operation prevention safety protection cover, and
the determination processing unit performs, based on operation for the emergency stop operation unit,
control for the driving execution unit such that the driving execution unit starts a braking sequence of the vehicle when an initial operation is executed for the emergency stop operation unit, and
control for the driving execution unit such that the driving execution unit operates the braking device of the vehicle to stop the vehicle when a subsequent operation is executed for the emergency stop operation unit.

(8)
The vehicle control device according to (6) or (7) noted above, wherein the emergency stop operation unit is a grip type lever operable back and forth as a direction of operation with respect to an advancing direction of the vehicle, and a start of an emergency stop operation is instructed in response to operation of the emergency stop operation unit backward with respect to the advancing direction of the vehicle.

(9)

The vehicle control device according to any one of (6) through (8) noted above, wherein control is performed such that emergency guidance associated with the emergency stop operation is given to a passenger as audio announcement information in a period from a first operation for instructing the start of the emergency stop operation to at least a second or subsequent operation for determining a stop of the vehicle.

(10)

The vehicle control device according to any one of (6) through (9) noted above, further including an invalidation operation unit that allows the driver to cancel the emergency stop operation as necessary when the driver has a normal judging ability during a period from a first operation for instructing the start of the emergency stop operation to at least a second or subsequent operation for determining a stop of the vehicle.

(11)

The vehicle control device according to any one of (6) through (10) noted above, further including an expressive operation unit that allows, as necessary, the third party to take over control of the vehicle provided with an automatic safety driving system.

(12)

The vehicle control device according to any one of (6) through (11) noted above, further including a hazard control unit that executes a blinking method of a hazard lamp in a manner different from normal blinking at the time of an emergency stop of the vehicle.

(13)

The vehicle control device according to (12) noted above, wherein the hazard control unit executes a blinking method of the hazard lamp for performing long-cycle blinking after short-cycle blinking.

(14)

A vehicle control method for a vehicle control device that includes a monitoring unit, a determination processing unit, and an output unit, the method including:
 monitoring, by the monitoring unit, a state of driver driving a vehicle,
 performing, by the determination processing unit, a determination process for recognizing an awakening state of the driver based on a monitoring result of the monitoring unit, and determining the awakening state of the driver, and
 performing, by the output unit, an output for expressly warning a third party other than the driver about lowering of the awakening state of the driver when the determination processing unit determines that the awakening state of the driver has lowered.

(15)

A program under which a vehicle control device including a monitoring unit, a determination processing unit, and an output unit is controlled, the program causing a computer to execute:
 monitoring, by the monitoring unit, a state of driver driving a vehicle;
 performing, by the determination processing unit, a determination process for recognizing an awakening state of the driver based on a monitoring result of the monitoring unit, and determining the awakening state of the driver; and
 performing, by the output unit, an output for expressly warning a third party other than the driver about lowering of the awakening state of the driver when the determination processing unit determines that the awakening state of the driver has lowered.

The present embodiment is not limited to the embodiment described above, but may be practiced with various modifications without departing from the subject matters of the present disclosure.

REFERENCE SIGNS LIST

11 Vehicle control device
12 Emergency stop determination unit
13 Driving execution unit
21 Monitoring unit
22 Output unit
23 Emergency stop operation unit
24 Invalidation switch
25 Recording unit
26 Determination processing unit
31 Environment recognition unit
32 Driving processing unit
33 Handle control unit
34 Speed control unit
35 Hazard control unit
41 Camera
42 Emergency stop operation unit
43 Speaker
44 Lamp
45 Communication device

The invention claimed is:

1. A method for decelerating a vehicle, the method comprising:
 monitoring a state of a driver of the vehicle;
 causing a notification that indicates the state of the driver to be output based on the monitored state of the driver, the notification being presented to a person inside the vehicle that is not the driver;
 determining, by circuitry of an information processing apparatus and when operating in a manual operation mode, whether to cause the vehicle to decelerate based on whether a first instruction to stop the vehicle is received in response to the notification that is output to the person inside the vehicle; and
 causing, by the circuitry, the vehicle to decelerate based on the determination of whether to cause the vehicle to decelerate, wherein
 the notification is presented by a light that emits a predetermined color based on the monitored state of the driver.

2. The method according to claim 1, wherein
 the step of causing the vehicle to decelerate includes causing the vehicle to decelerate based on a determination that the first instruction is received after the notification is output.

3. The method according to claim 2, further comprising:
 causing a warning to be provided inside the vehicle before causing the vehicle to decelerate.

4. The method according to claim 2, further comprising:
 determining whether a second instruction to stop the vehicle is received after the first instruction is received; and
 causing the vehicle to stop based on a determination that the second instruction is received.

5. The method according to claim 2, further comprising:
determining whether a third instruction to cancel the first instruction is received from the driver after the first instruction is received; and
canceling the deceleration of the vehicle based on a determination that the third instruction is received after the first instruction.

6. The method according to claim 1, wherein
the notification includes feedback to the driver based on the monitored state of the driver, and
the method further comprises:
determining whether to cause the vehicle to perform an emergency stop,
automatically causing the vehicle to perform an immediate stop based on a determination to cause the vehicle to perform the emergency stop, and
causing the vehicle to perform a guided manual stop based on a determination that the emergency stop is not to be performed.

7. The method according to claim 1, further comprising:
limiting a top speed of the vehicle based on the monitored state of the driver.

8. The method according to claim 1, wherein the step of monitoring comprises:
monitoring eye movement or a sight line of the driver.

9. The method according to claim 1, further comprising:
causing activation of at least one of hazard lights or a horn of the vehicle during the deceleration of the vehicle.

10. The method according to claim 9, wherein the hazard lights are activated such that a short period of light is emitted twice and a long period of light is emitted once.

11. A non-transitory computer-readable medium storing instructions which, when executed by a computer, causes the computer to perform a method for decelerating a vehicle, the method comprising:
monitoring a state of a driver of the vehicle;
causing a notification that indicates the state of the driver to be output based on the monitored state of the driver, the notification being presented to a person inside the vehicle that is not the driver;
determining, when operating in a manual operation mode, whether to cause the vehicle to decelerate based on whether a first instruction to stop the vehicle is received in response to the notification that is output to the person inside the vehicle; and
causing the vehicle to decelerate based on the determination of whether to cause the vehicle to decelerate, wherein
the notification is presented by a light that emits a predetermined color based on the monitored state of the driver.

12. An information processing apparatus, comprising:
circuitry configured to
monitor a state of a driver of a vehicle;
cause a notification that indicates the state of the driver to be output based on the monitored state of the driver, the notification being presented to a person inside the vehicle that is not the driver;
determine, when operating in a manual operation mode, whether to cause the vehicle to decelerate based on whether a first instruction to stop the vehicle is received in response to the notification that is output to the person inside the vehicle; and
cause the vehicle to decelerate based on the determination of whether to cause the vehicle to decelerate, wherein
the notification is presented by a light that emits a predetermined color based on the monitored state of the driver.

13. The information processing apparatus according to claim 12, wherein the circuitry is configured to
determine whether the first instruction to stop the vehicle is received after the notification is output; and
cause the vehicle to decelerate based on a determination that the first instruction is received after the notification is output.

14. The information processing apparatus according to claim 13, wherein the circuitry is configured to
cause a warning to be provided inside the vehicle before causing the vehicle to decelerate.

15. The information processing apparatus according to claim 13, wherein the circuitry is configured to
determine whether a second instruction to stop the vehicle is received after the first instruction is received; and
cause the vehicle to stop based on a determination that the second instruction is received.

16. The information processing apparatus according to claim 13, wherein the circuitry is configured to
determine whether a third instruction to cancel the first instruction is received from the driver after the first instruction is received; and
cancel the deceleration of the vehicle based on a determination that the third instruction is received after the first instruction.

17. The information processing apparatus according to claim 12, wherein
the notification includes feedback to the driver based on the monitored state of the driver, and
the circuitry is configured to
determine whether to cause the vehicle to perform an emergency stop,
automatically cause the vehicle to perform an immediate stop based on a determination to cause the vehicle to perform the emergency stop, and
cause the vehicle to perform a guided manual stop based on a determination that the emergency stop is not to be performed.

18. The information processing apparatus according to claim 12, where the circuitry is configured to:
limit a top speed of the vehicle based on the monitored state of the driver.

19. The information processing apparatus according to claim 12, wherein the circuitry is configured to:
monitor eye movement or a sight line of the driver.

20. The information processing apparatus according to claim 12, wherein the circuitry is configured to
cause activation of at least one of hazard lights or a horn of the vehicle during the deceleration of the vehicle.

21. The information processing apparatus according to claim 20, wherein the hazard lights are activated such that a short period of light is emitted twice and a long period of light is emitted once.

22. An information processing apparatus, comprising:
means for monitoring a state of a driver of a vehicle;
means for causing a notification that indicates the state of the driver to be output based on the monitored state of the driver, the notification being presented to a person inside the vehicle that is not the driver;
means for determining, when operating in a manual operation mode, whether to cause the vehicle to decelerate based on whether a first instruction to stop the vehicle is received in response to the notification that is output to the person inside the vehicle; and means for causing the vehicle to decelerate based on the determination of whether to cause the vehicle to decelerate, wherein
the notification is presented by a light that emits a predetermined color based on the monitored state of the driver.

* * * * *